(12) United States Patent
Corder

(10) Patent No.: US 7,814,341 B1
(45) Date of Patent: Oct. 12, 2010

(54) POWER SUPPLY

(76) Inventor: Justin Corder, 119 W. 3rd St., Apt. 1, Redwood Falls, MN (US) 56283

( * ) Notice: Subject to any disclaimer, the term of this patent is extended or adjusted under 35 U.S.C. 154(b) by 711 days.

(21) Appl. No.: 11/567,437

(22) Filed: Dec. 6, 2006

Related U.S. Application Data

(60) Provisional application No. 60/742,661, filed on Dec. 6, 2005.

(51) Int. Cl.
  *G06F 1/00* (2006.01)
  *H01J 7/14* (2006.01)
  *H01J 7/00* (2006.01)

(52) U.S. Cl. .................. 713/300; 713/323; 361/600; 362/183; 320/104; 320/105; 320/112

(58) Field of Classification Search ............. 713/323, 713/300; 362/183; 361/600; 320/104, 105, 320/112
See application file for complete search history.

(56) References Cited

U.S. PATENT DOCUMENTS

| | | | | |
|---|---|---|---|---|
| 5,170,336 | A * | 12/1992 | Getter et al. | 363/141 |
| 5,568,370 | A * | 10/1996 | Goldstein et al. | 363/34 |
| 5,949,640 | A * | 9/1999 | Cameron et al. | 361/600 |
| 6,476,509 | B1 * | 11/2002 | Chen et al. | 290/1 R |
| 6,636,015 | B1 * | 10/2003 | Levine et al. | 320/105 |
| 2003/0128507 | A1 * | 7/2003 | Metcalf | 361/686 |
| 2004/0121225 | A1 * | 6/2004 | Krieger et al. | 429/96 |
| 2005/0102043 | A1 * | 5/2005 | Menas et al. | 700/22 |
| 2005/0156564 | A1 * | 7/2005 | Krieger | 320/112 |
| 2006/0087815 | A1 * | 4/2006 | Lanni | 361/695 |
| 2007/0002562 | A1 * | 1/2007 | VanWambeke et al. | 362/183 |

OTHER PUBLICATIONS

Tactical Power "ETI's Rugged Tactical Power Products" Jan. 24, 2005.*
Power Stream "48 volt to 12 volt DC/DC converter" Aug. 2, 2003.*
"Tactical Inverter Product Description", Energy Technologies, Inc. http://www.tacticalpower.com/rugged_tactical_power_inverter.htm; Jan. 25, 2007.

* cited by examiner

*Primary Examiner*—Vincent T Tran
(74) *Attorney, Agent, or Firm*—Steven M. Koehler; Westman, Champlin & Kelly, P.A.

(57) ABSTRACT

A power supply that is housed in a case is provided. Outlets of the power supply are provided external to the case such that the case can be closed during operation of the power supply. The case can provide protection for components of the power supply as well as provide a mobile system that can easily be transported. One or more cooling fans and passageways can further be provided to cool components of the power supply. Additionally, two or more independent power systems can be provided in the power supply to allow for redundancy.

19 Claims, 8 Drawing Sheets

POWER SUPPLY

CROSS-REFERENCE TO RELATED APPLICATION

The present application is based on and claims the benefit of U.S. provisional patent application Ser. No. 60/742,661, filed Dec. 6, 2005, the contents of which is hereby incorporated by reference in its entirety.

BACKGROUND

Power supplies are used in a number of different applications. For example, power supplies can transfer power from a source to an end device. Current power supplies are used to transfer power from a vehicle battery to an end device. These power supplies can be prone to damage by various contaminants interfering with components of the power supply. Additionally, these power supplies can be difficult to use given a location of outlets as well as provide safety hazards during operation of devices that draw power from the power supply.

Furthermore, in military applications and in particular military vehicles, a power source can require a specialized connection. One such connection is referred to as the NATO (North Atlantic Treaty Organization) slave connection found in military vehicles. The NATO slave connection includes a specialized connector and receptacle that were developed to become a standard for military vehicles across several NATO countries. Current NATO slave receptacles found in military vehicles are adapted to provide, in some instances, 24 volts of direct current from a battery. While connecting NATO compatible connectors/devices to the NATO slave receptacle can be straightforward, connecting other devices directly to a vehicle battery and providing power to these devices can be expensive and cumbersome. For example, a United States military vehicle would have to go through an expensive and time consuming modification process in addition to administrative constraints in modifying the vehicle. Additionally, the modification process can be prone to errors and subsequent damage to equipment.

The discussion above is merely provided for general background information and is not intended to be used as an aid in determining the scope of the claimed subject matter.

SUMMARY

A power supply that is housed in a case is provided. Outlets of the power supply are provided external to the case such that the case can be closed during operation of the power supply. The case can provide protection for components of the power supply as well as provide a mobile system that can easily be transported. One or more cooling fans and passageways can further be provided to cool components of the power supply. Additionally, two or more independent power systems can be provided in the power supply to allow for redundancy.

This Summary is provided to introduce some concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Concepts presented herein relate to a power supply that is provided in a light weight, compact and mobile package. The package can be rugged and durable to withstand harsh use in a number of different environmental conditions to protect interior components from contaminants (i.e. dirt, sand, rain, etc.) and external forces. Additionally, the power supply is easily transported, for example from one vehicle to another vehicle, with relative ease. Connection cables can be provided with the package to easily allow connection to a vehicle's battery. Electrical components of the power supply can make the power supply versatile and serve a variety of different mobile power requirements. Independent power systems can be provided to meet these mobile power requirements as well as provide redundancy.

Figure 1:
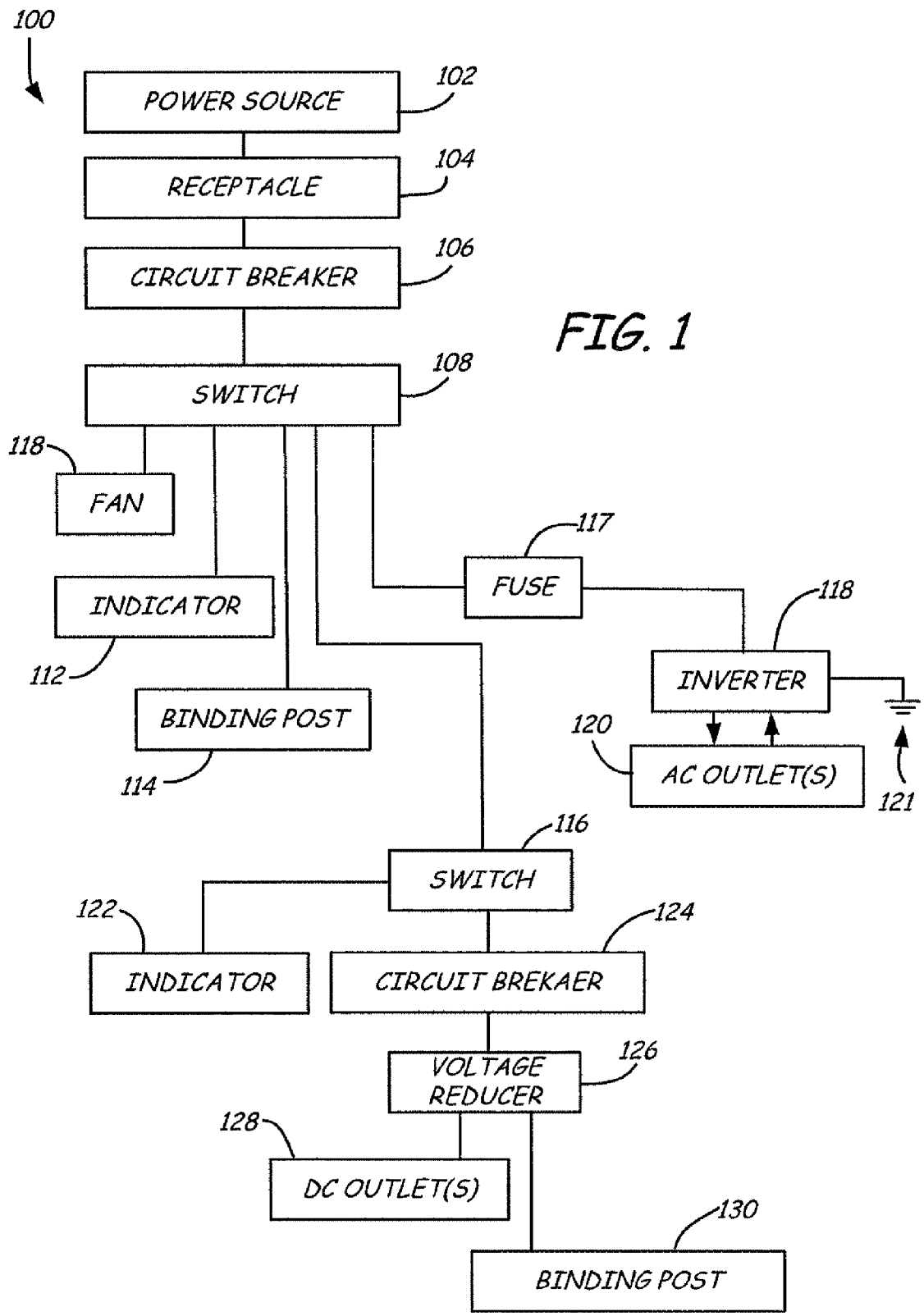
FIG. 1 is a schematic diagram of components in a power supply.

FIG. 1 is a schematic diagram of components of a power supply 100. As appreciated by those skilled in the art, one or more of the components of power supply 100 can be connected or otherwise electrically coupled through one or more binding or terminal strips. Suitable wire can be used to provide electrical connections among components of the supply. In one example, 16 gauge insulated wire is used. Power is provided to power supply 100 from a power source 102 through a cable and a connector to a receptacle 104. In one example, power source 102 is a military vehicle battery that includes a NATO slave receptacle connection delivering 24 volts of direct current. Example vehicles that include a 24 volt direct current NATO slave cable adapter includes, but is not limited to, US Military 5 ton trucks and 2.5 ton tracks, Humvees, M-113 Armored Personnel Carriers, M2A1 Bradley Infantry Fighting Vehicles, M1A1 Abrams Main Battle Tank and Stryker wheeled vehicles. When using a NATO slave adapter, receptacle 104 can be a NATO slave receptacle.

Power is provided from receptacle 104 to a circuit breaker 106. The circuit breaker can be rated to any suitable level such as 10 amp, 15 amp, 20 amp, etc. From circuit breaker 106, power is provided to a switch 108, which can provide an on/off setting for power supply 100. Switch 108 selectively provides power to fan 110, an indicator 112, a set of binding posts 114, a switch 116 and a fuse 117, which leads to an inverter 118. Fan 110 provides a cooling mechanism for power supply 100 and indicator 112 indicates whether or not power is flowing through switch 108. Indicator 112 can be a light emitting diode (LED). Fuse 117 can be a resetable or non-resettable fuse.

Binding posts 114 supply current to a device connected thereto through wires that can connect to the binding post 114, for example through bare wires. Inverter 118 converts direct current from switch 108 to alternating current that is provided to one or more alternating current outlets 120. One suitable inverter is a 300 watt 24 VDC to 120 VAC Pure Sine Wave Inverter available from Lind Electronics of Minneapolis, Minn., although other inverters rated to various specifications can be used. In one example, outlets 120 include a standard 120 volt alternating current outlet. If desired, a ground fault circuit interrupter (GFCI) outlet can be used. Other AC output voltages can also be provided such as 100 volts, 110 volts, 115 volts, 220 volts, 230 volts, 240 volts, etc.

A ground terminal on AC outlet 120 can further be wired through inverter 118 to a ground connection 121.

Switch 116 controls power flow to an indicator 122 and a circuit breaker 124. Indicator 122 indicates whether or not power is flowing through switch 116. For example, indicator 122 can be a light emitting diode (LED). Circuit breaker 124 provides power to a voltage reducer 126, which reduces voltage provided from switch 116. Circuit breaker 124 can be rated to any suitable level such as 10 amp, 15 amp, 20 amp, etc. In one embodiment, voltage reducer 126 can transform 24 volts of direct current to 12 volts of direct current. One example voltage reducer is a 24 volt to 12 volt voltage reducer that delivers 180 watts of power available from Palco Electronics, Inc. of Southgate, Mich. Other reducers with various specifications can also be used. Power passing through voltage reducer 126 is provided to one or more direct current outlets 128 and a set of binding posts 130. Direct current outlets can be standard cigarette lighter plugs providing 12 volts of direct current and binding posts 130 can provide 12 volts of direct current to devices connected thereto.

Figure 2:
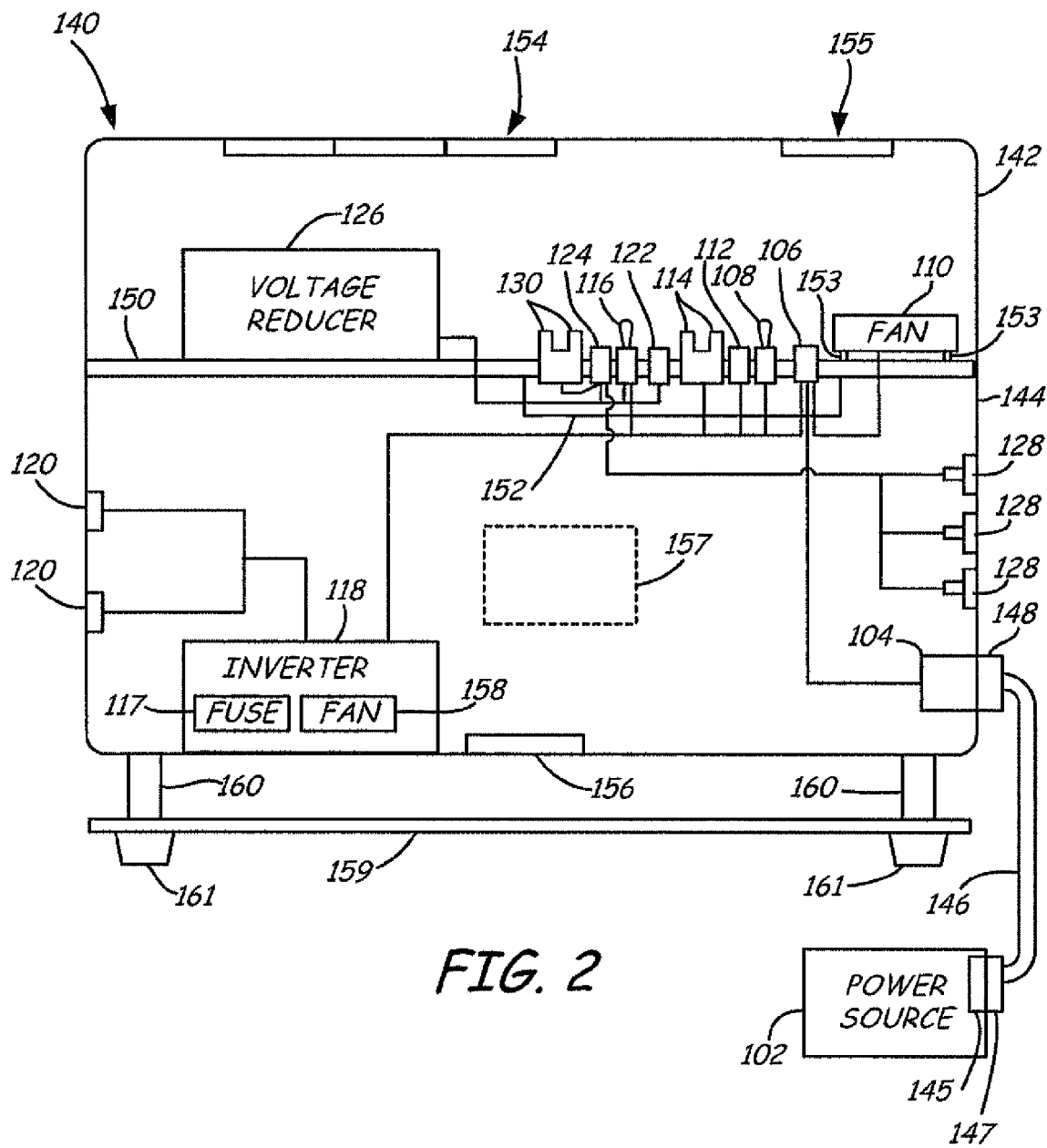
FIG. 2 is a schematic diagram of components of a power supply in a case.
Figure 3:
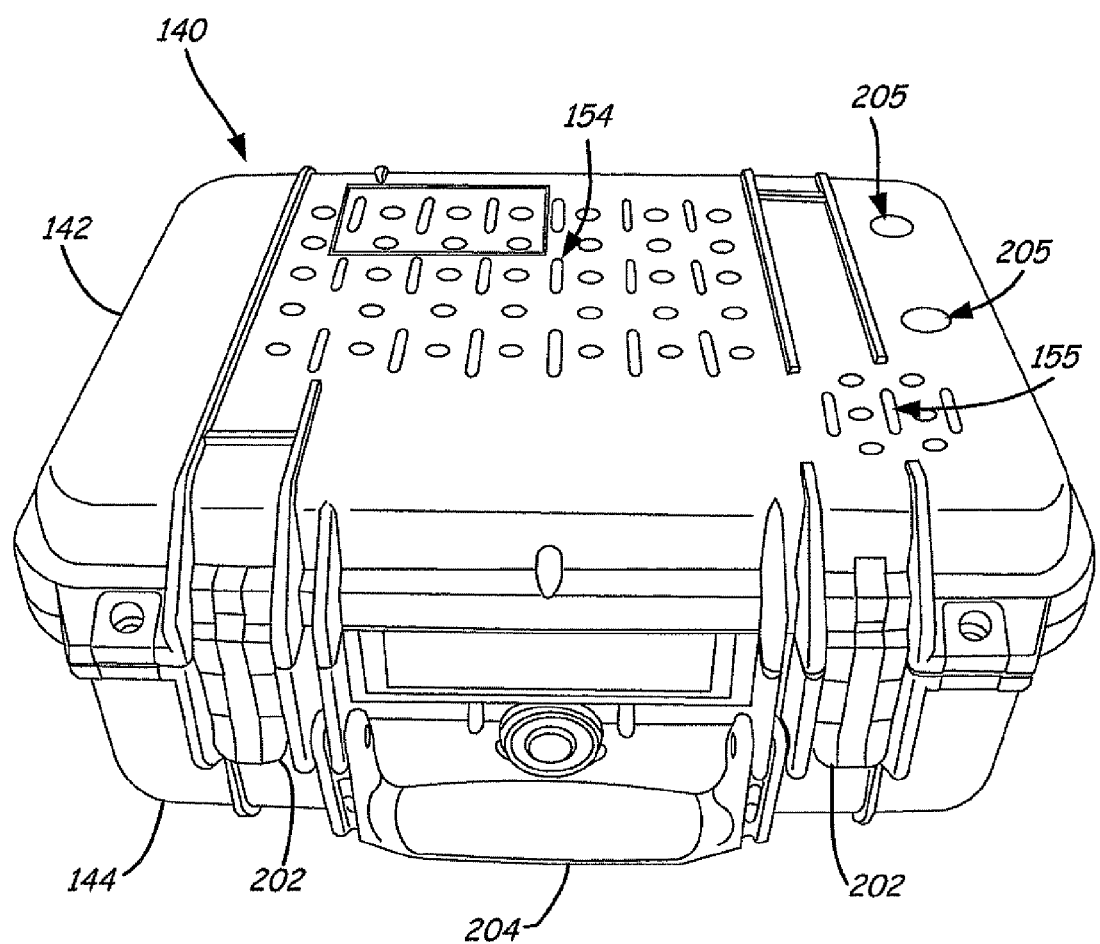
FIG. 3 is a view of a top of a case housing a power supply.

In order to provide a portable and rugged power supply, components of the power supply 100 can be positioned within a case 140 as illustrated in FIG. 2. One example case is a Pelican case available from Pelican Products, Inc. of Torrance, Calif. Case 140 includes an upper portion or cover 142 and a lower portion or base 144. Upper portion 142 is a cover that is connected to lower portion 144 through a hinge (not shown) and can open and close case 140. When cover 142 is lifted away from base 144 to open case 140, an operator has access to several of the components of power supply 100. When the upper portion 142 closes case 140, power supply 100 remains operational with access to receptacle 104 and outlets 120 and 128.

As illustrated in FIG. 2, receptacle 104 is positioned to receive a connector external to case 140. For example, power source 102 having a NATO Slave Receptacle 145 and connected to a NATO power plug 147 through a cable 146 and connector 148 that is connected to receptacle 104. NATO power plug 147 is available from Lind Electronics of Minneapolis, Minn. Connector 148 can be an Amphenol® Radsok® output available from Digi-Key Corporation of Thief River Falls, Minn., In this case, receptacle 104 can be an Amphenol® Radsok® input power receptacle available from Digi-Key Corporation.

Positioned within case 140 is a mounting plate 150. Mounting plate 150 can be made of aluminum and adapted to be secured to base 144 such that an operator has access to components mounted above plate 150 when case 140 is open. A cable from receptacle 104 can be wired to a terminal or binding strip 152 that is provided and mounted to plate 150 such that components of power supply 100 can be connected thereto. Components that are also mounted to plate 150 include circuit breaker 106, switch 108, indicator 112, binding posts 114, switch 116, indicator 122, circuit breaker 124, voltage reducer 126 and binding posts 130. AC outlets 120 are positioned in case 140 such to allow access to outlets 120 from an outside of case 140. Similarly, DC outlets 128 are provided with access to the outside of case 140. Inverter 118 can be mounted to base 144.

Additionally, FIG. 2 illustrates that fan 110 is spaced apart from mounting plate 150 to allow airflow through fan 110 by standoffs 153. Case 140 is also provided with a plurality of openings 154, 155, 156 and 157 to allow airflow in and out of case 140. For example, air can be drawn into case 140 through opening 154 by fan 110. Air is drawn under fan 110 and out opening 155. Inverter 118 also includes a fan 158, which can draw air from outside case 140 through opening 156 and out opening 157. Also coupled to case 140 is a bottom plate 159 spaced apart from case 140 by standoffs 160. Standoffs 160 allow a plurality of airflow passages in multiple directions into case 140. Bottom plate 159 also includes a plurality of feet 161, which can be rubber molded nuts that provide a stable surface for case 140. Rubber molded feet are available from Poly Products of Gauraipada, Vasai at www.polyproducts.com.

FIGS. 3-9 illustrate an exemplary power supply positioned within a case as discussed above. As illustrated, case 140 includes cover 142 and base 144 connected by hinges 200. Cover 142 includes clips 202 adapted to secure cover 142 to base 144. Additionally, base 144 includes a handle 204 that can be used to carry power supply 100. Cover 142 also includes openings 205 that allow wires connected to binding posts 114 and 130 to go into case 140 such that power can be drawn from posts 114 and 130 while case 140 is closed.

Figure 4:
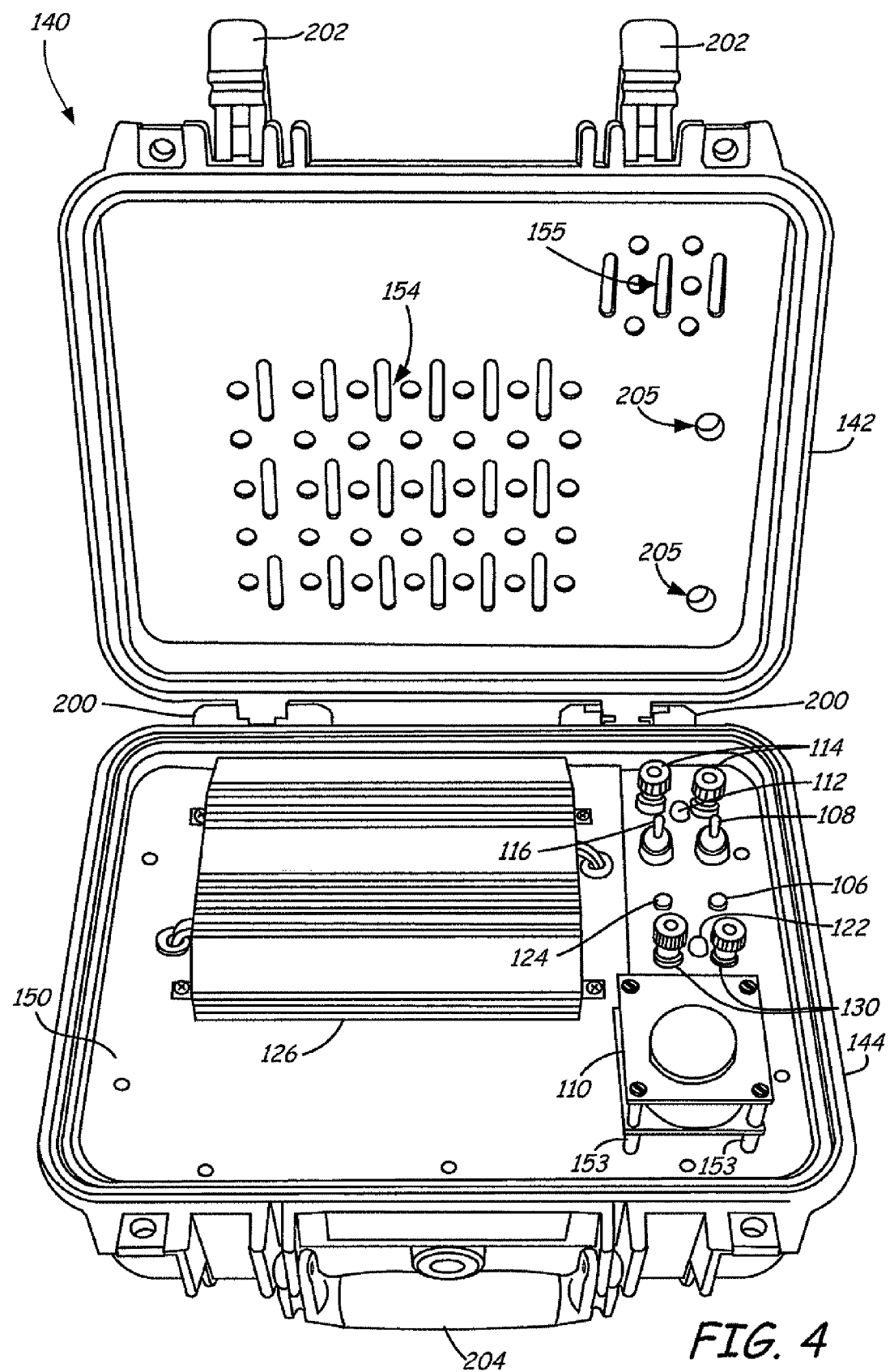
FIG. 4 is a view of the case of FIG. 3 with a cover open.

As illustrated in FIG. 4, mounting plate 150 is provided in and secured to base 144. Mounted to mounting plate 150, for access by an operator, are switches 108 and 116, binding posts 114 and 130 and circuit breakers 106 and 126. Indicators 112 and 122 can also be mounted to plate 150 to be viewed by the operator. When case 140 is open, the operator can easily turn on/off switches 108 and 116, connect devices to binding posts 114 and 130 as well as reset circuit breakers 106 and 124. Circuit breakers 106 and 124 from outside can be so called "pop-up" fuses available from Digi-Key Corporation. Fan 110 is also mounted to mounting plate 150 and is spaced apart therefrom by standoffs 153.

Figure 5:
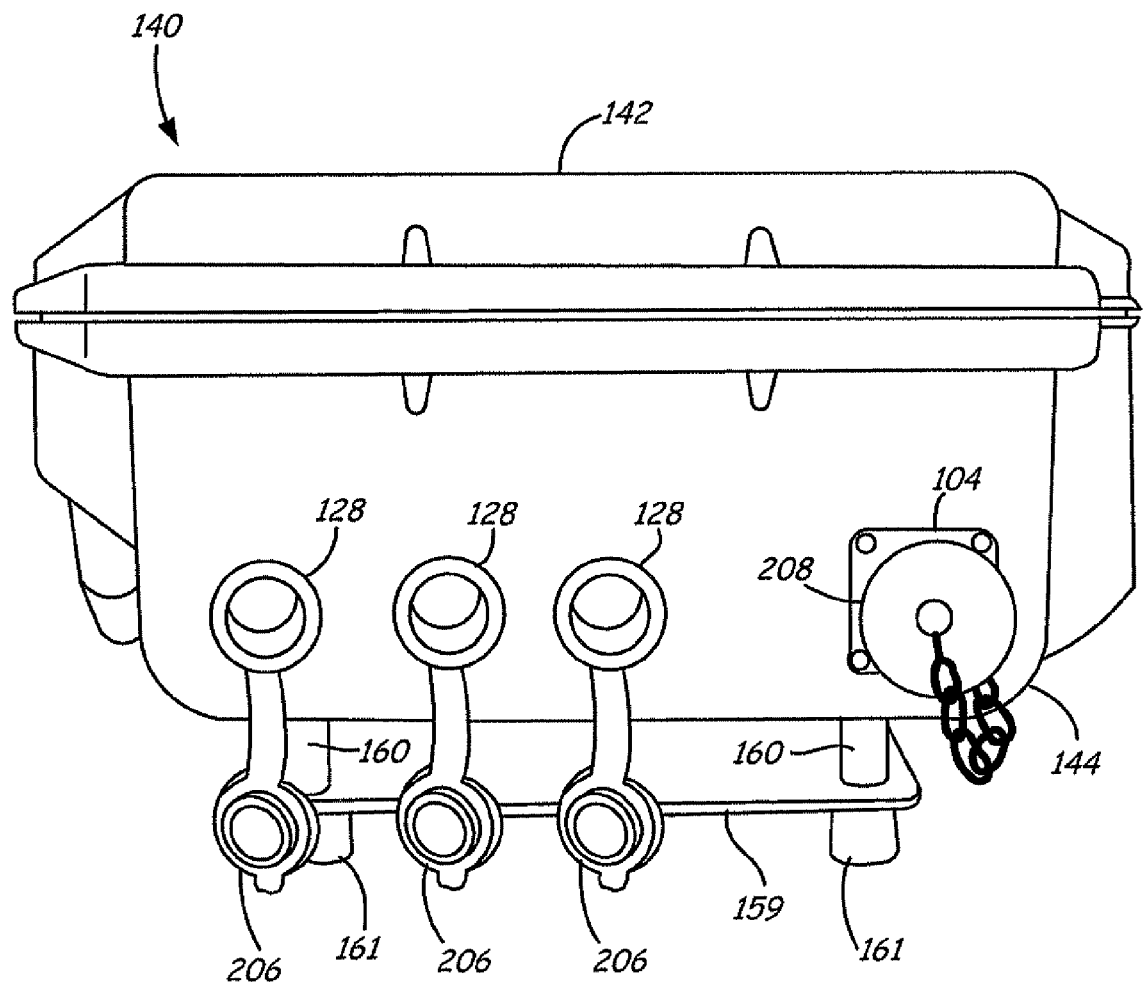
FIG. 5 is a side view of the case of FIG. 3.
Figure 6:
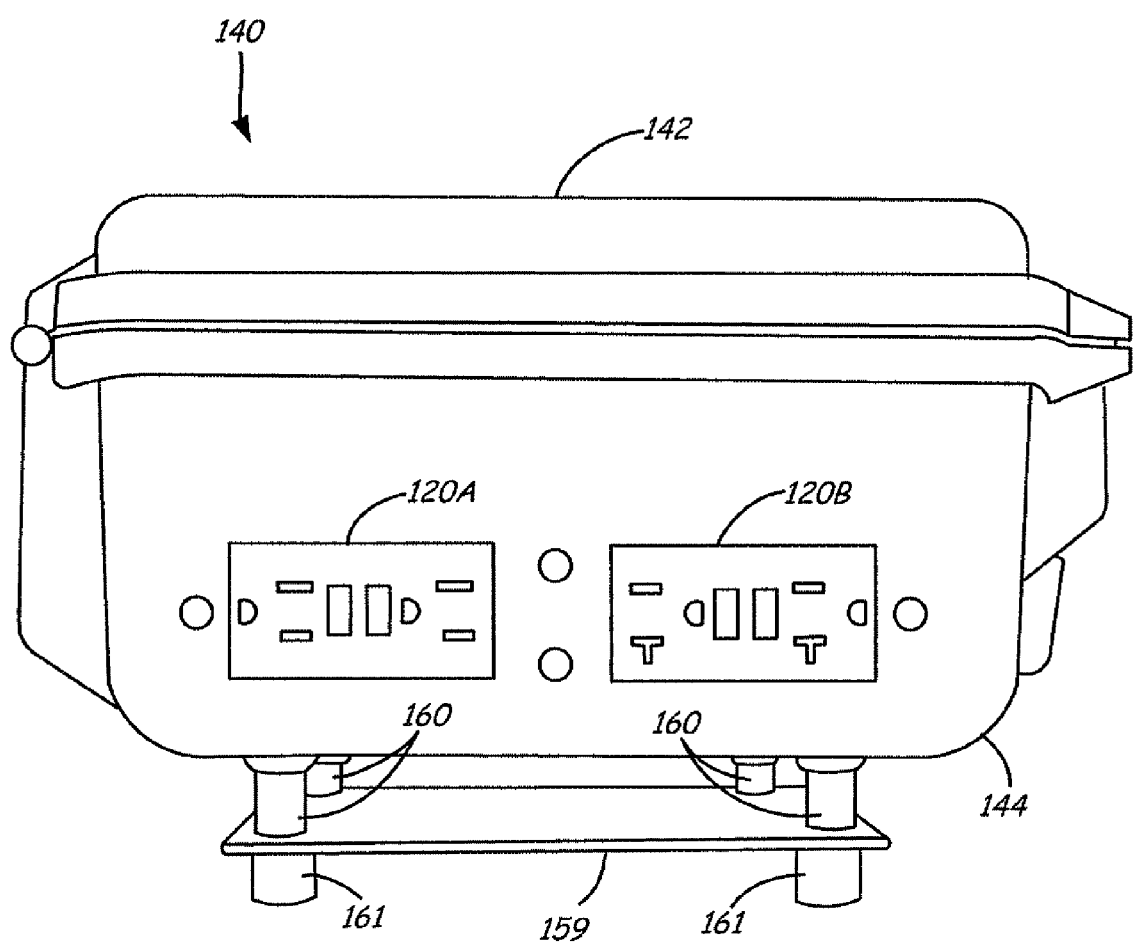
FIG. 6 is a side view of the case of FIG. 3.

FIG. 5 and FIG. 6 illustrate opposite sides of case 140. FIG. 5 illustrates DC outlets 128 that are accessible from outside of case 140. Furthermore, caps 206 can be provided to prevent unwanted contaminants from reaching DC outlets 128. Additionally, receptacle 104 is accessible from an outside of case 140. If desired, a suitable dust cap 208 can be provided to protect receptacle 104. FIG. 6 illustrates AC outlets 120 positioned on the outside of case 140. If desired, suitable covers can also be provided to protect contaminants from reaching outlets 120A and 120B. It is worth noting that outlet 120B is a GFCI outlet and that outlets 120A and 120B are of opposite orientation. Providing outlets 120A and 120B in an opposite orientation allow for devices that have large power supplies to be connected to the outlets without other power supplies interfering therewith.

Figure 7:
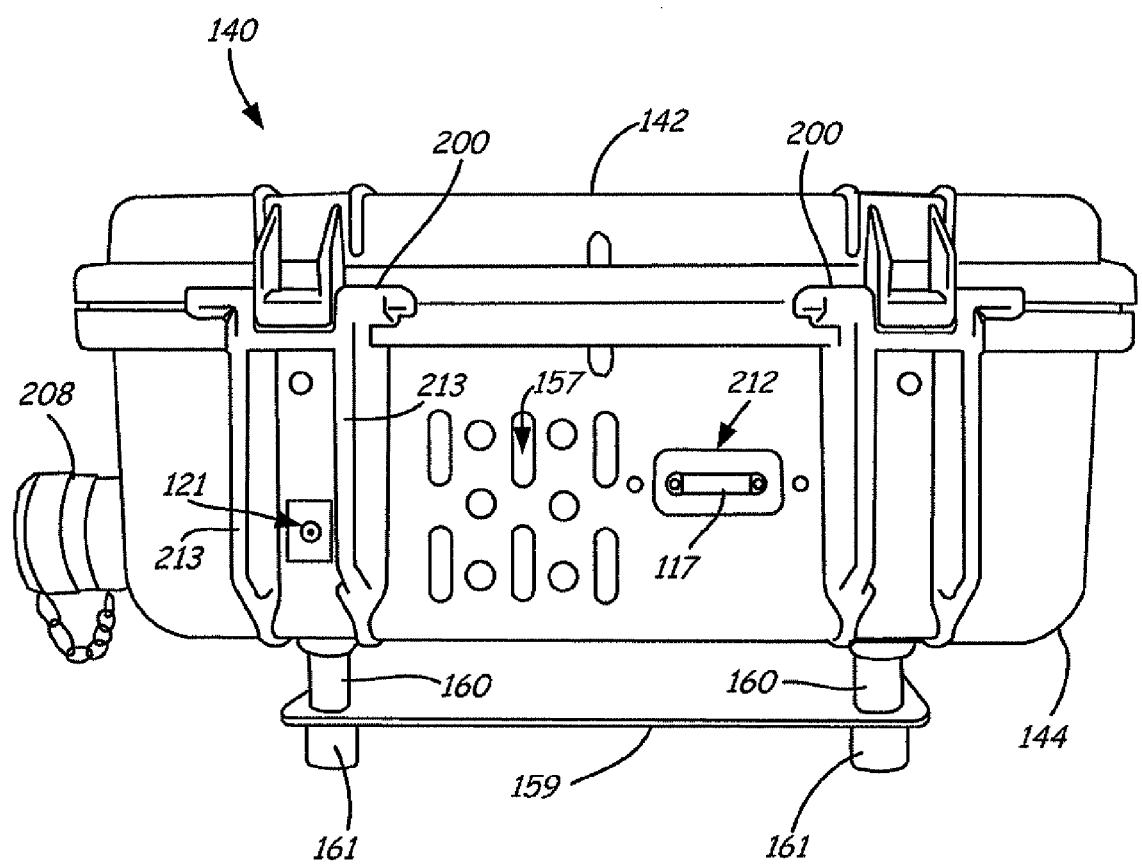
FIG. 7 is a rear view of the case of FIG. 3.
Figure 8:
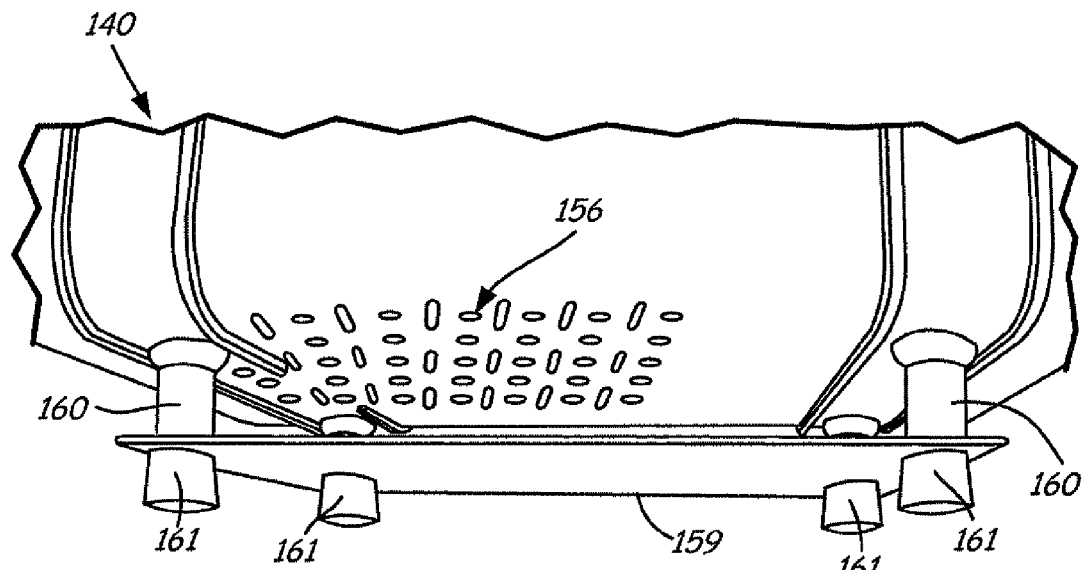
FIG. 8 is a bottom view of the case of FIG. 3.
Figure 9:
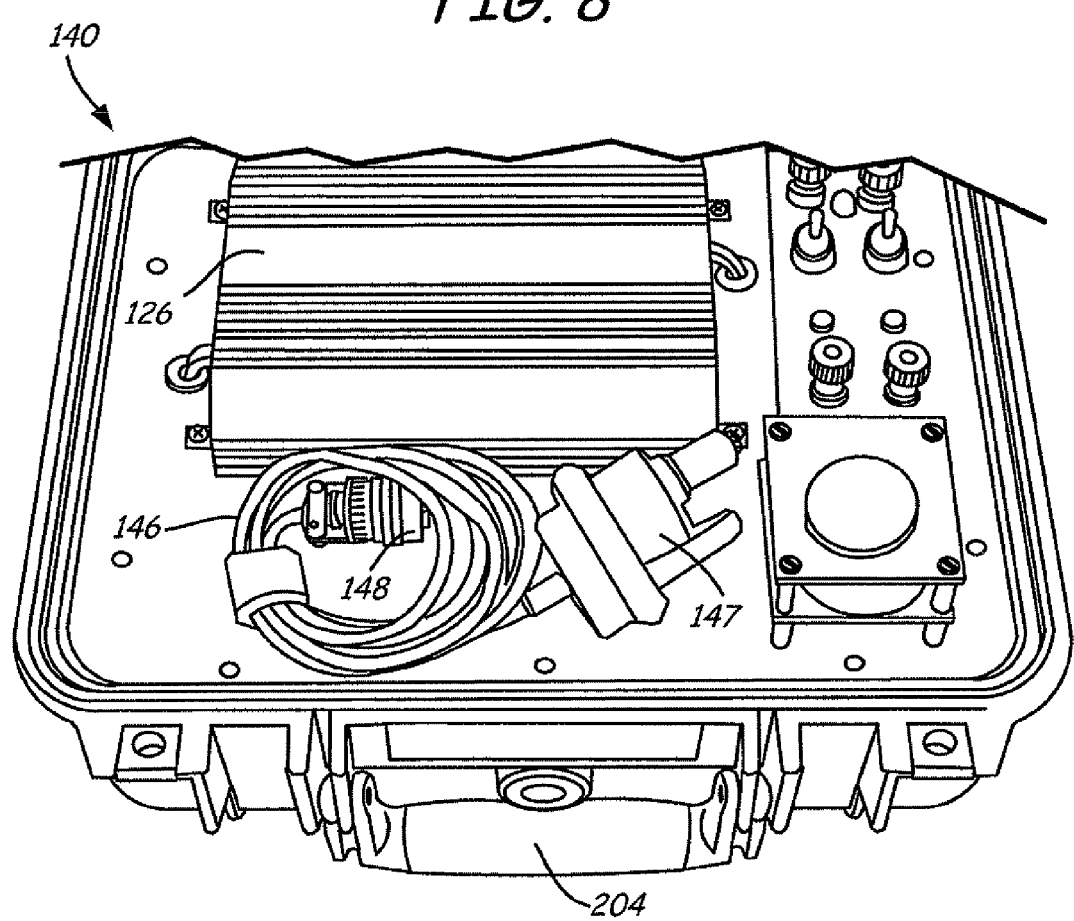
FIG. 9 is a view of the case of FIG. 3 with a connector cable stored therein.

FIG. 7 illustrates a back side of case 140 that includes openings 157 for a fan on inverter 118 and an access opening 212 to provide access to fuse 117 of inverter 118. Opening 212 allows an operator to replace or reset fuse 117. FIG. 8 is a bottom view of case 140 that shows air flow passages provided by standoffs 160 to reach opening 156 in case 140. Additionally, ground connection 121 is positioned between ribs 213. Ground connection 121 can be a jack allowing a wire to be connected thereto to a ground connection of inverter 118 and AC outlets 120A and 120B. FIG. 9 is another view of case 140 in which cable 146 is stored in the case 140. Cable 146 includes connector 148 for connecting to receptacle 104 as well as connector 147 for connecting to a NATO slave power receptacle. In this manner, cable 146 can be easily transported with case 140 and used to connect supply 100 to a power source such as a NATO slave receptacle 145 in an efficient manner.

Although the subject matter has been described in language specific to structural features and/or methodological acts, it is to be understood that the subject matter defined in the appended claims in not necessarily limited to the specific features or acts described above. Rather, the specific features and acts described above are disclosed as example forms of implementing the claims.

What is claimed is:

1. A power supply, comprising:
a case having an inside, an outside, a cover, and a base coupled to the cover;
a receptacle positioned on the outside of the case for receiving power from a DC power source at a first voltage;
an inverter positioned on the inside of the case and electrically coupled to the receptacle;
at least one AC outlet positioned on the outside of the case, the at least one AC outlet electrically coupled to the receptacle through the inverter;
at least one DC outlet positioned on the outside of the case, the at least one DC outlet electrically coupled to the receptacle through a voltage reducer such that it provides a voltage that is less than the first voltage;
at least one set of binding posts positioned in the inside of the case, the at least one set of binding posts electrically coupled to the receptacle such that it provides a voltage that is the same as the first voltage;
a mounting plate positioned within and secured to the base, the mounting plate supporting the voltage reducer and the at least one set of binding posts;
a cooling fan positioned in the case, the cooling fan being located between the mounting plate and the cover, the cooling fan being separated from the mounting plate by a plurality of standoffs; and
at least one opening in the cover above the at least one set of binding posts, the at least one opening facilitating wires to be connected to the at least one set of binding posts when the case is closed; and
wherein the power supply is configured to remain operational when the case is closed, the closed case protecting interior components from contaminants and external forces.

2. The power supply of claim 1, further comprising:
additional openings in the cover, the additional openings being spaced apart from the at least one opening, the additional openings configured to allow air to flow to the cooling fan; and
wherein the inverter is mounted to the base and is separated from the cover by the mounting plate.

3. The power supply of claim 2, further comprising:
a bottom plate spaced apart from the base by at least one support post to form a passageway to the case, the bottom plate having a first side and a second side, wherein the case is located opposite the first side, and wherein a plurality of feet are located opposite the second side;
at least one cap attached to the base that is positionable to inhibit contaminants from reaching the at least one DC outlet;
a dust cap attached to the base that is positionable to inhibit contaminants from reaching the receptacle;
wherein the at least one DC outlet includes at least one cigarette lighter plug; and
wherein the at least one AC outlet includes two AC outlets having opposite orientations.

4. The power supply of claim 3, wherein the at least one AC outlet comprises a ground fault circuit interrupter outlet, the ground fault circuit interrupter outlet being electrically coupled to a ground connection jack through the inverter, the ground connection jack positioned on the outside of the case.

5. The power supply of claim 4, further comprising:
two circuit breakers electrically coupled between the receptacle and the voltage reducer.

6. The power supply of claim 5, further comprising:
a first switch and a second switch, the first and the second switches electrically coupled between the receptacle and the voltage reducer, each of the two switches selectively providing power to the voltage reducer.

7. The power supply of claim 6, further comprising:
a first light emitting diode electrically coupled to the first switch, the first light emitting diode indicating whether or not power is flowing through the first switch; and
a second light emitting diode electrically coupled to the second switch, the second light emitting diode indicating whether or not power is flowing through the second switch.

8. The power supply of claim 7, wherein the first and the second switches are electrically coupled between the two circuit breakers, and wherein one of the two circuit breakers is electrically coupled between the receptacle and the inverter.

9. The power supply of claim 8, further comprising:
a second cooling fan, the second cooling fan being located within the inverter.

10. The power supply of claim 9, further comprising:
an additional set of binding posts, the additional set of binding posts electrically coupled to the voltage reducer.

11. A power supply, comprising:
a case having a cover and a base defining an interior and exterior of the case;
a power receptacle positioned on the exterior of the case and adapted to receive power from a NATO slave connector;
a plate secured to the base on the interior of the case;
a first set of binding posts that are electrically coupled to the power receptacle through a first switch and a first circuit breaker;
a second set of binding posts that are electrically coupled to the power receptacle through a voltage reducer, a second circuit breaker, a second switch, the first switch, and the first circuit breaker;
a DC outlet that is electrically coupled to the power receptacle through the voltage reducer, the second circuit breaker, the second switch, the first switch, and the first circuit breaker, the DC outlet being positioned on the exterior of the case;
an AC outlet that is electrically coupled to the power receptacle through an inverter, a fuse, the first switch, and the first circuit breaker, the inverter being mounted on the base, and the AC outlet being positioned on the exterior of the case; and
wherein the first set of binding posts, the second set of binding posts, and the voltage reducer are mounted on the plate.

12. The power supply of claim 11, further comprising:
a cable that connects the receptacle to a 24 volt direct current NATO slave power receptacle; and
wherein the first circuit breaker, the first switch, the second switch, and the second circuit breaker are mounted on the plate.

13. The power supply of claim 12, further comprising:
a hinge connecting the cover and the base; and
one or more clips on the cover that secure the cover to the base in a closed position.

14. The power supply of claim 13, further comprising:
a first indicator electrically coupled to the receptacle through the first circuit breaker and the first switch, the first indicator providing an indication of whether power is flowing through the first switch; and
a second indicator electrically coupled to the receptacle through the first circuit breaker, the first switch, and the second switch, the second indicator providing an indication of whether power is flowing through the second switch.

15. The power supply of claim 14, wherein the first and the second indicators are light emitting diodes, and wherein the first and second indicators are mounted on the plate.

16. The power supply of claim 15, wherein the AC outlet includes a ground terminal that is connected through the inverter to a ground connection, the ground connection being a jack that is positioned on the exterior of the case.

17. The power supply of claim 16, further comprising:
a fan mounted above the plate to allow airflow between the plate and the fan, the fan being electrically coupled to the receptacle through the first circuit breaker and the first switch.

18. The power supply of claim 17, further comprising:
a bottom plate spaced apart from the base by a plurality of standoffs to allow airflow between the bottom plate and the base, the bottom plate having feet on a side opposite the base.

19. The power supply of claim 18, further comprising:
multiple passageways in the case that allow airflow to the interior of the case; and
an access opening in the base that provides access to the inverter.

* * * * *